United States Patent [19]

Kulmaczewski

[11] Patent Number: 5,383,363
[45] Date of Patent: Jan. 24, 1995

[54] INERTIAL MEASUREMENT UNIT PROVIDING LINEAR AND ANGULAR OUTPUTS USING ONLY FIXED LINEAR ACCELEROMETER SENSORS

[75] Inventor: David M. Kulmaczewski, Farmington Hills, Mich.

[73] Assignee: Ford Motor Company, Dearborn, Mich.

[21] Appl. No.: 17,403

[22] Filed: Feb. 10, 1993

[51] Int. Cl.⁶ .............................................. G01P 3/04
[52] U.S. Cl. ........................................ 73/510; 73/514
[58] Field of Search ................... 73/510, 514, 517 B, 73/517 R, 517 A

[56] References Cited

U.S. PATENT DOCUMENTS

| | | | |
|---|---|---|---|
| 4,188,816 | 2/1980 | Mairson | 73/1 |
| 4,445,376 | 5/1984 | Merhav | 73/510 |
| 4,512,192 | 4/1985 | Peters | 73/505 |
| 4,566,327 | 1/1986 | Rider | 73/510 |
| 4,590,801 | 5/1986 | Merhav | 73/510 |
| 4,601,206 | 7/1986 | Watson | 73/514 |
| 4,821,572 | 4/1989 | Hulsing | 73/510 |
| 4,896,268 | 1/1990 | MacGugan | 364/453 |

Primary Examiner—Richard E. Chilcot, Jr.
Assistant Examiner—William L. Oen
Attorney, Agent, or Firm—Roger L. May; Peter Abolins

[57] ABSTRACT

An inertial measurement unit is provided in which an arrangement of linear accelerometers in fixed positions measure angular acceleration and other inertial characteristics. Only linear acceleration readings are required for measurement of angular acceleration, and both expensive angular sensors and cyclically driven linear accelerometers are eliminated. A processor receives the linear accelerometer signals and calculates output values related to both the angular and linear motion of the body. In the preferred embodiment, the inertial measurement unit includes at least nine linear accelerometers, three disposed with their respective sensitive axes in substantially mutually orthogonal relationship defining first, second and third axes intersecting at a single origin point, and a pair of linear accelerometers disposed along each axis spaced at fixed distances from the origin point with their sensitive axes in substantially orthogonal relationship with each other and the axis. The present invention also includes a control system using the inertial measurement unit of the present invention to control the operation of a first component in response to angular motion of a second component connected thereto, and a method for inertial measurement of angular acceleration.

17 Claims, 2 Drawing Sheets 5,383,363

1

INERTIAL MEASUREMENT UNIT PROVIDING LINEAR AND ANGULAR OUTPUTS USING ONLY FIXED LINEAR ACCELEROMETER SENSORS

BACKGROUND OF THE INVENTION

The present invention relates to the use of linear accelerometers for inertial measurement and, in particular, to an inertial measurement unit in which an arrangement of fixed linear accelerometers measures angular acceleration, angular velocity, linear acceleration and linear velocity.

Due to practical operational limitations of gyroscopes, various inertial measurement units incorporating linear accelerometers have been developed to measure angular acceleration and angular velocity in addition to linear acceleration and linear velocity. Such units require that some or all of the linear accelerometers be driven cyclically to provide output which may then be processed to determine angular acceleration and velocity. In some units, the linear accelerometers are spun or rotated around an axis, while in others they are vibrated or dithered about or along an axis. Regardless, while overcoming the limitations of gyroscopic devices, the necessary cyclical drive mechanism adds a further level of complexity and cost to these units. In addition, complex mathematical derivations necessary to process signals produced by driven liner accelerometers have required simplifying assumptions which are the source of unacceptable measurement errors in some applications.

Accordingly, the need exists for improved inertial measurement units which avoid the complexity, cost and problems experienced with devices having cyclically driven linear accelerometers.

SUMMARY OF THE INVENTION

The present invention satisfies that need by providing an inertial measurement unit in which all linear accelerometer components are fixed in position, and only linear acceleration readings are required for measurement of angular acceleration. Not only are expensive angular sensors avoided, cyclical motion of linear accelerometers for inertial measurement is eliminated, along with the related cost and complexity thereof.

In the inertial measurement unit of the present invention a plurality of linear accelerometers are located in fixed positions relative to an object or rigid body whose angular and linear motion are to be measured. The inertial measurement unit further includes a processor means for receiving linear accelerometer signals and for calculating from those signals output values related to both the angular and linear motion of the body.

The inertial measurement unit preferably includes at least nine linear accelerometers, three disposed with their respective sensitive axes in substantially mutually orthogonal relationship defining first, second and third axes intersecting at a single origin point, and a pair of linear accelerometers disposed along each axis spaced at fixed distances from the origin point. The first, second and third pairs of linear accelerometers intersect the first, second and third axes, respectively, along which they are displaced with their sensitive axes in substantially orthogonal relationship with each other and the axis.

In accordance with a further aspect of the present invention, a control system is provided using the inertial measurement unit of the present invention to control

2 the operation of a first component in response to angular motion of a second component connected thereto. In the control system an inertial measurement unit as described above is to one of the first and second components, and means for operating the first component responsive to output values related to angular and linear motion, operate the first component in a given condition. For example, in an application where a radar antenna (first component) is to be mounted and maintained in a stable condition atop a vehicle (second component) as it travels, the inertial measurement unit is located on the vehicle, and means for operating the first component, i.e. drive motors, adjust the antennae mounting in response to vehicular motion to maintain a relative position of the antenna with respect to a frame of reference, such as true vertical, or the horizon. Other applications exist for the control system of the present invention in which equipment operation is initiated or interrupted when certain types or levels of angular motion are sensed.

Finally, in accordance with the present invention, a method for inertial measurement of angular acceleration and angular velocity is provided. The method includes the steps of positioning a plurality of linear accelerometers in fixed positions relative to a body whose angular and linear motion are to be measured, operating the linear accelerometers to produce linear accelerometer signals, processing those signals with a processor means, and calculating from the linear accelerometer signals output values related to both the angular and linear motion of the body.

DETAILED DESCRIPTION OF THE PREFERRED EMBODIMENTS

Figure 3:
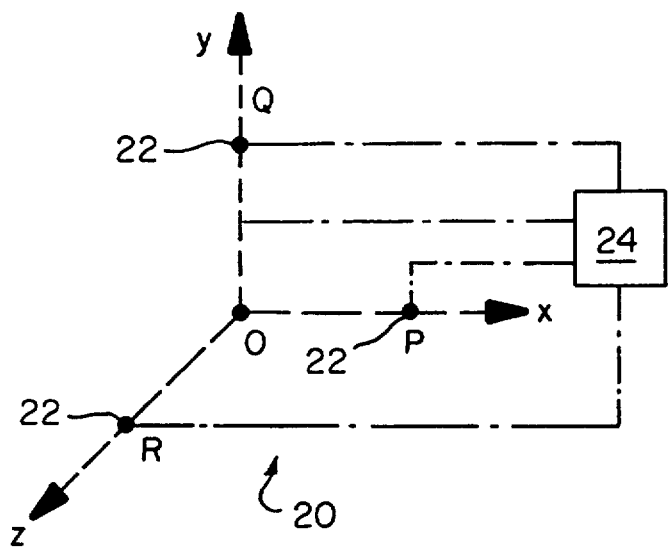
FIG. 3 is a schematic perspective view of the inertial measurement system of the present invention.

In accordance with the present invention, an inertial measurement unit 20 is provided as shown in FIG. 3 which includes a plurality of linear accelerometers 22 located in fixed positions relative to an object or rigid body 10 whose angular and linear motion are to be measured, and a processor means 24 which receives linear accelerometer signals therefrom, and calculates output values related to both the angular and linear motion of the body 10. Such use of linear accelerometers 22 in fixed positions, rather than in cyclical motion, has resulted from a different approach to the problem of measuring angular motion with linear accelerometers. A review of the mathematics which support the use of fixed position linear accelerometers facilitates an understanding of the present invention. Linear accelerometers 22 may also be referred to as sensors herein.

Figure 1:
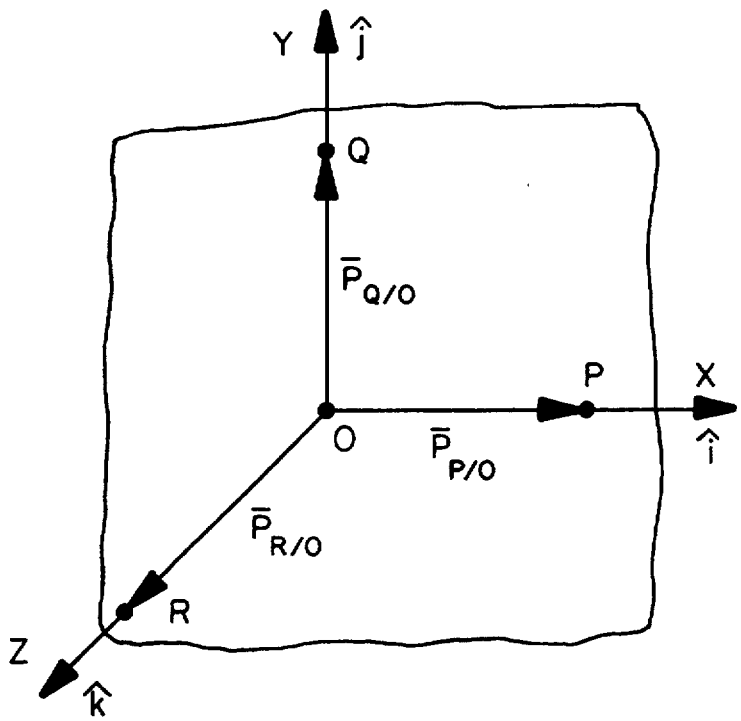
FIG. 1 is a schematic representation of a theoretical rigid body.

Referring to FIG. 1, for a rigid body 10, the acceleration of a point P with respect to point O is:

$$\ddot{r}_P = \ddot{R}_O + \dot{\omega} \times \overline{PP/O} + \omega \times (\omega \times \overline{PP/O}),  \quad (1)$$

where $\ddot{\vec{r}}_p$ is the linear acceleration of point P, $\ddot{\vec{R}}_O$ is the linear acceleration of point O, $\overline{p_{P/O}}$ marks the position of point P with respect to point O, $\vec{\omega}$ is the angular velocity of the rigid body, and $\dot{\vec{\omega}}$ is the angular acceleration of the rigid body. All of these are vector quantities, with components in the directions of the three unit vectors, $\hat{i}$, $\hat{j}$ and $\hat{k}$. These terms can be written in their component form as follows:

$$\ddot{\vec{r}}_p = \ddot{r}_{Px}\hat{i} + \ddot{r}_{Py}\hat{j} + \ddot{r}_{Pz}\hat{k} \quad (2)$$

$$\ddot{\vec{R}}_O = \ddot{R}_{Ox}\hat{i} + \ddot{R}_{Oy}\hat{j} + \ddot{R}_{Oz}\hat{k} \quad (3)$$

$$\overline{p_{P/O}} = r_{P/O}\hat{i} \quad (4)$$

$$\vec{\omega} = \omega_x\hat{i} + \omega_y\hat{j} + \omega_z\hat{k} \quad (5)$$

$$\dot{\vec{\omega}} = \dot{\omega}_x\hat{i} + \dot{\omega}_y\hat{j} + \dot{\omega}_z\hat{k} \quad (6)$$

Note that $\overline{p_{P/O}}$ only has a component in the $\hat{i}$ direction.
By substituting equations (2)–(6) into equation (1), we get:

$$\ddot{r}_{Px}\hat{i} + \ddot{r}_{Py}\hat{j} + \ddot{r}_{Pz}\hat{k} = (\ddot{R}_{Ox}\hat{i} + \ddot{R}_{Oy}\hat{j} + \ddot{R}_{Oz}\hat{k}) + (\dot{\omega}_x\hat{i} + \dot{\omega}_y\hat{j} + \dot{\omega}_z\hat{k})$$
$$\times r_{P/O}\hat{i} + (\omega_x\hat{i} + \omega_y\hat{j} + \omega_z\hat{k}) \times [(\omega_x\hat{i} + \omega_y\hat{j} + \omega_z\hat{k}) \times r_{P/O}\hat{i}] \quad (7)$$

Performing the cross-products, this reduces to:

$$(\ddot{r}_{Px} - \ddot{R}_{Ox})\hat{i} + (\ddot{r}_{Py} - \ddot{R}_{Oy})\hat{j} + (\ddot{r}_{Pz} - \ddot{R}_{Oz})\hat{k} = -(\omega_y^2 + \omega_z^2)r_{P/O}\hat{i} + (\dot{\omega}_z + \omega_x\omega_y)r_{P/O}\hat{j} + (-\dot{\omega}_y + \omega_x\omega_z)r_{P/O}\hat{k} \quad (8)$$

Using this same procedure to calculate the accelerations of points Q with respect to O and R with respect to O (noting that $\overline{p_{Q/O}}$ has only a $\hat{j}$ component and $\overline{p_{R/O}}$ has only a $\hat{k}$ component), we obtain the following equations:

$$(\ddot{r}_{Qx} - \ddot{R}_{Ox})\hat{i} + (\ddot{r}_{Qy} - \ddot{R}_{Oy})\hat{j} + (\ddot{r}_{Qz} - \ddot{R}_{Oz})\hat{k} = (-\dot{\omega}_z + \omega_x\omega_y)r_{Q/O}\hat{i} + r_{Q/O}(-\omega_x^2 - \omega_z^2)\hat{j} + (\dot{\omega}_x + \omega_y\omega_z)r_{Q/O}\hat{k} \quad (9)$$

and $$(\ddot{r}_{Rx} - \ddot{R}_{Ox})\hat{i} + (\ddot{r}_{Ry} - \ddot{R}_{Oy})\hat{j} + (\ddot{r}_{Rz} - \ddot{R}_{Oz})\hat{k} = (\dot{\omega}_y + \omega_x\omega_z)r_{R/O}\hat{i} + (-\dot{\omega}_x + \omega_y\omega_z)r_{R/O}\hat{j} - (\omega_x^2 + \omega_y^2)r_{R/O}\hat{k} \quad (10)$$

Using equations (8)–(10), we wish to solve for the angular acceleration variables $\dot{\omega}_x$, $\dot{\omega}_y$, and $\dot{\omega}_z$, while mathematically eliminating the cross-products $\omega_x\omega_y$, $\omega_x\omega_z$, and $\omega_y\omega_z$. This approach differs from the prior art wherein the cross product terms were retained, and attempts are made to minimize their significance. In accordance with the present invention, to solve for $\dot{\omega}_x$, from the $\hat{k}$ components of (9) and the $\hat{j}$ components of (10), where the term $\dot{\omega}_x$ appears, we form the following set of equations:

$$(\ddot{r}_{Qz} - \ddot{R}_{Oz}) = r_{Q/O}(\dot{\omega}_x + \omega_y\omega_z)$$
$$(\ddot{r}_{Ry} - \ddot{R}_{Oy}) = r_{R/O}(-\dot{\omega}_x + \omega_y\omega_z) \quad (11)$$

Solving that set of equations for $\omega$, we obtain:

$$\dot{\omega}_x = \frac{(\ddot{r}_{Qz} - \ddot{R}_{Oz})}{2r_{Q/O}} - \frac{(\ddot{r}_{Ry} - \ddot{R}_{Oy})}{2r_{R/O}} \quad (12)$$

In similar fashion, using the $\hat{k}$ component of (8) and the $\hat{i}$ component of (10) to solve for $\dot{\omega}_y$, $$\dot{\omega}_y = \frac{(\ddot{r}_{Rx} - \ddot{R}_{Ox})}{2r_{R/O}} - \frac{(\ddot{r}_{Pz} - \ddot{R}_{Oz})}{2r_{P/O}} \quad (13)$$

and using the $\hat{j}$ component of (8) and the $\hat{i}$ component of (9) to solve for $\dot{\omega}_z$, we get:

$$\dot{\omega}_z = \frac{(\ddot{r}_{Py} - \ddot{R}_{Oy})}{2r_{P/O}} - \frac{(\ddot{r}_{Qx} - \ddot{R}_{Ox})}{2r_{Q/O}} \quad (14)$$

Figure 2:
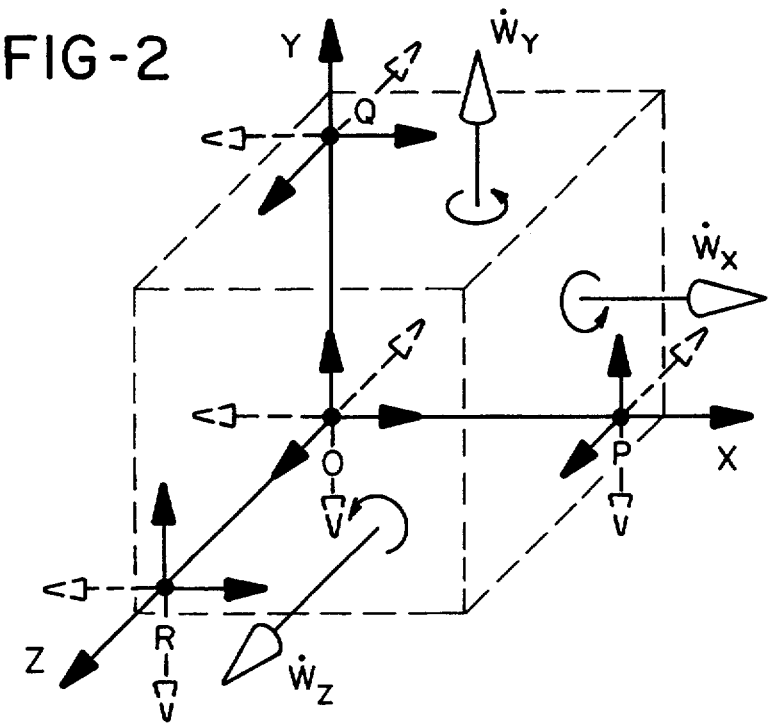
FIG. 2 is a schematic perspective view of the preferred locations of linear accelerometers relative to a rigid body in accordance with the present invention.

From equation (12), we see that the angular acceleration of a body about the x-axis can be calculated by measuring the linear acceleration of point O in the y- and z- directions, of point Q in the z-direction, and of point R in the y-direction. Thus, four linear accelerometers in the proper configuration can be used to sense angular acceleration in one axis. Using similar reasoning with equations (13) and (14), we can configure sets of four linear accelerometers to sense angular acceleration in the y-axis or the z-axis. By overlapping the accelerometers where possible, we can sense angular acceleration along all three axes using a minimum total of nine linear accelerometers if properly configured. For this method to work, the linear accelerometers 22 are preferably arranged in fixed positions as shown in FIG. 2. Three are located at point 0, with their sensitive axes aligned with the x-, y- and z- axes (also referred to herein as the first, second and third axes). The remaining six are located at points P, Q, and R, and are preferably displaced along each axis by a distance r and aligned so that the sensitive axes of the two sensors at each point are substantially aligned with the two coordinate axes orthogonal to the displacement vector. This arrangement is preferred for simplicity.

The points P, Q and R may alternatively be positioned at different distances $r_1$, $r_2$ and $r_3$. As well, the sensitive axes of the two sensors at each point need not be aligned with the coordinate axes orthogonal to the displacement vector. Rather, without introducing undue complication into the mathematics, the two sensors at each point may be in fixed positions in a plane perpendicular to the displacement vector, rotated a known amount relative to the coordinate axes orthogonal to the displacement vector. Correction for the known angular displacement is then required to normalize the linear accelerometer signals for processing. However, the simplicity of calculation, and some sensor sensitivity is lost in this alternative arrangement. Similarly, the orthoganol axes defined by the three sensors at the origin O may be rotated a known amount relative to the x-, y- and z- displacement axes, and a corrective calculation also made to normalize their linear accelerometer signals for processing to determine angular and linear acceleration. Again, some sensor sensitivity is lost. Nonetheless, these and other variations in the fixed positions of the linear accelerometers are understood to be within the scope of the present invention.

Regardless of the configuration, but particularly using the preferred configuration of FIG. 2, the inertial measurement unit 12 will be triply redundant in measuring linear acceleration in addition to measuring angular acceleration.

By knowing the displacement distances and measuring the nine accelerations, we can implement equations (12), (13), and (14) and thus 'sense' $\dot{\vec{\omega}}$. This can be processed to arrive at $\vec{\omega}$ and the angular position vector, $\vec{\Theta}$.

In such calculations, it is assumed that the three sensors at O, and pairs of sensors at points P, Q and R are co-located at the same point. In fact, such sensors are only substantially co-located. However, recent improvements in manufacturing technology have made linear accelerometers available in chips the size of integrated circuits. The small size of the linear accelerometers thus permits them to be substantially co-located at desired points, introducing negligible error into calculations by the slight dislocation from theoretical points. Further, as the distance separating points P, Q and R from O increases, the error from the slight dislocation decreases. Thus, the accuracy of the angular and linear output values from the processor means 24 is thereby maintained. Moreover, the same improvements in manufacturing technology have made such linear accelerometers lower in cost. Using these sensors to sense angular motion in accordance with the present invention thus permits low-cost production of a compact sensor capable of sensing both angular and linear motion.

The pairs of linear accelerometers 22 in the inertial measurement unit 20 of the present invention, are preferably spaced as far from the point O as possible, and are preferably mounted directly in or on the body 10 or body whose motion is to be sensed. However, alternatively, the linear accelerometers 22 may be mounted or arranged with proper axial orientation in a separate structure, housing, or unit which may be connected to an body 10 whose angular and linear motion are to be measured.

Figure 4:
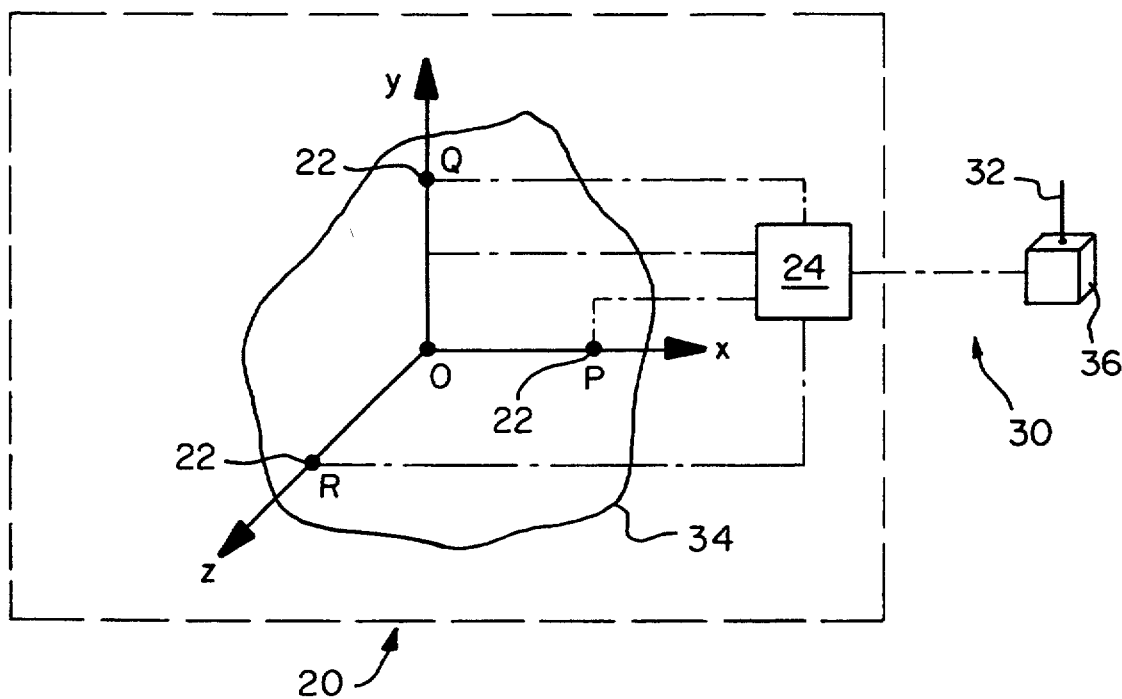
FIG. 4 is a schematic perspective view of the control system of the present invention.

In accordance with a further aspect of the present invention shown in FIG. 4, a control system 30 is provided using the inertial measurement unit 20 of the present invention to control the operation of a first component 32 in response to at least the angular motion of a second component 34 connected thereto. It is understood that the first component 32 may be connected directly or indirectly to the second component 34. In the control system 30 an inertial measurement unit 20 is connected to one of the first and second components 32 and 34 (or a structure attached thereto), and means 36 for operating the first component, which means 36 is responsive to output values related to at least angular motion of the second component 34, operate the first component 32 in a given condition.

As schematically shown in FIG. 4, and without intent to limit the invention thereto, an application of the control system 30 includes a radar antenna (first component 32) which is mounted and maintained in a stable condition or attitude atop a vehicle (second component 34) as it travels, the inertial measurement unit is located on the vehicle. Means 36 for operating the first component, i.e. drive means or drive motors for positioning the antennae, adjust the antennae mounting to maintain the desired relative position of the antenna with respect to a frame of reference independent of the first and second components 32 and 34.

Again, in control system 30 applications of the present invention, the inertial measurement unit 20 may be located on either the first or second component 34 or 36 and provide needed input to the means 36 for operating. Generally, it is preferred to located the inertial measurement unit 20 on the second component 34 where the condition or operation of the first component 32 is desired. Other applications exist for the control system of the present invention in which equipment operation is initiated or interrupted when certain types or levels of angular motion are sensed. Such applications are within the scope of the present invention.

Finally, in accordance with the present invention, a method for inertial measurement of angular acceleration and angular velocity is provided. With reference to FIGS. 1–3, the method includes the steps of positioning a plurality of linear accelerometers 22 in fixed positions relative to an body 10 whose angular and linear motion are to be measured, operating the linear accelerometers 22 to produce linear accelerometer signals, processing those signals with a processor means 24, and calculating from the linear accelerometer signals output values related to both the angular and linear motion of the body 10. The preferred positions for positioning the linear accelerometers 22 are as discussed in accordance with the linear accelerometer structure. That is, the step of positioning the plurality of linear accelerometers in fixed positions relative to a body 10 preferably includes the steps of positioning three linear accelerometers 22 such that their respective sensitive axes are in substantially mutually orthogonal relationship to define first, second and third axes (x-, y-and z- axes, respectively) intersecting at a single point to define an origin point O at which they are co-located, and positioning pairs of the linear accelerometers 22 at points P, Q, and R, along the first, second and third axes, where they are co-located, respectively. It is understood that, so positioned, the sensitive axes intersect the respective axes at points P, Q and R. The step of positioning the pairs of linear accelerometers is preferably performed at a constant distance r along each axis, and such that the sensitive axes of the two sensors at each point are substantially aligned with the two coordinate axes orthogonal to the displacement axis.

Alternatively the axes of the two sensors may be angularly rotated to fixed positions offset from the two coordinate axes, while remaining in a plane substantially perpendicular to the displacement axis for mathematical simplicity.

Further, alternatively, the step of positioning may include positioning the plurality of linear accelerometers in fixed positions in a structure, and then connecting the structure to a body 10 whose angular and linear motion are to be measured.

While certain representative embodiments and details have been shown for purposes of illustrating the present invention, it will be apparent to those skilled in the art that various changes in the device, system and method disclosed herein may be made without departing from the scope of the invention, which is defined in the appended claims.

What is claimed is:

1. An inertial measurement unit for measuring the angular acceleration of a body about a first axis where the body has a first, second and third axis that are substantially mutually orthogonal and intersect at an origin point, said unit comprising:

a plurality of linear accelerometers in fixed positions relative to the body, each of said linear accelerometers having a sensitive axis for producing linear accelerometer signals, the plurality of linear accelerometers including a first accelerometer with its sensitive axis positioned to measure the linear acceleration of the origin point along the second axis, a second accelerometer with its sensitive axis positioned to measure the linear acceleration of the origin point along the third axis, a third accelerometer with its sensitive axis positioned to measure the linear acceleration along the third axis of a second point on the second axis, and a fourth accelerometer with its sensitive axis positioned to measure the linear acceleration along the second axis of a third point on the third axis; and processor means for receiving said linear accelerometer signals and calculating from said signals output values related to at least the angular motion of said body about said first axis.

2. The inertial measurement unit of claim 1 wherein:
said plurality of linear accelerometers are disposed in fixed positions in a structure; and
said structure is adapted for connection to a body whose angular and linear motion are to be measured.

3. The inertial measurement unit of claim 1 wherein:
said plurality of linear accelerometers includes at least nine linear accelerometers; and
at least two pairs of said linear accelerometers, each of said pairs being positioned to measure a linear acceleration of a different point, with the sensitive axes of each of said pairs being in substantially orthogonal relationship with each other.

4. The inertial measurement unit of claim 3 wherein said plurality of linear accelerometers include:
three linear accelerometers disposed with their respective sensitive axes in substantially mutually orthogonal relationship to define therewith said first, second and third axes intersecting at said origin point;
a first pair of linear accelerometers disposed along said first axis spaced a first fixed distance from said origin point, said sensitive axes thereof intersecting said first axis and in substantially orthogonal relationship with each other and with said first axis;
a second pair of linear accelerometers disposed along said second axis spaced a second fixed distance from said origin point, said sensitive axes thereof intersecting said second axis and in substantially orthogonal relationship with each other and with said second axis; and
a third pair of linear accelerometers disposed along said third axis spaced a third fixed distance from said origin point, said sensitive axes thereof intersecting said third axis and in substantially orthogonal relationship with each other and with said third axis.

5. The inertial measurement unit of claim 4 wherein at least two of said first, second and third fixed distances are substantially the same.

6. The inertial measurement unit of claim 4 wherein:
said first pair of linear accelerometers is further positioned such that the sensitive axis of ones of said linear accelerometers are also substantially parallel with said second and third axes;
said second pair of linear accelerometers is further positioned such that the sensitive axis of ones of said linear accelerometers are also substantially parallel with said first and third axes; and
said third pair of linear accelerometers is further positioned such that the sensitive axis of ones of said linear accelerometers are also substantially parallel with said first and second axes.

7. The inertial measurement unit of claim 4 wherein the sensitive axes of said linear accelerometers in at least one of said pairs of linear accelerometers are not substantially parallel to ones of said first, second and third axes.

8. The inertial measurement unit of claim 4 wherein said three linear accelerometers are substantially co-located at said origin point, and said first, second and third pairs of said linear accelerometers are substantially co-located at said first, second and third distances along said first, second and third axes, respectively.

9. A control system for controlling the operation of a first component in response to at least the angular motion of a second component connected thereto, said control system comprising:
an inertial measurement unit disposed in one of said first and second components, said inertial measurement unit including:
at least nine linear accelerometers in fixed positions, said linear accelerometers all connected in a fixed relationship to the same one of said first and second components, each of said linear accelerometers having a sensitive axis for producing linear accelerometer signals, said at least nine linear accelerometers including:
three linear accelerometers disposed with their respective sensitive axes in substantially mutually orthogonal relationship to define therewith first, second and third axes intersecting at a single point to define an origin point;
a first pair of linear accelerometers disposed along said first axis spaced a first fixed distance from said origin point, said sensitive axes thereof intersecting said first axis and in substantially orthogonal relationship with each other and with said first axis;
a second pair of linear accelerometers disposed along said second axis spaced a second fixed distance from said origin point, said sensitive axes thereof intersecting said second axis and in substantially orthogonal relationship with each other and with said second axis; and
a third pair of linear accelerometers disposed along said third axis spaced a third fixed distance from said origin point, said sensitive axes thereof intersecting said third axis and in substantially orthogonal relationship with each other and with said third axis; and
processor means for receiving said linear accelerometer signals and calculating from said signals output values related to at least the angular motion of said one component; and
means for operating said first component responsive to said output values to operate said first component in a given condition, said means for operating including means for receiving said output values.

10. The control system of claim 9 wherein said means for operating said first component further comprises drive means for positioning said first component to maintain a given position in response to said output values related to said angular motion.

11. The control system of claim 10 wherein said inertial measurement unit is disposed on said first component and said drive means for positioning maintains said first component in a given position relative to a frame of reference independent of said first and second components.

12. The control system of claim 10 wherein said inertial measurement unit is disposed on said second component and said drive means for positioning maintains said first component in a given position relative to a frame of reference independent of said first and second components.

13. The control system of claim 9 wherein said three linear accelerometers are substantially co-located at said origin point, and said first, second and third pairs of said linear accelerometers are substantially co-located at said first, second and third distances along said first, second and third axes, respectively.

14. A method for inertial measurement of angular acceleration and angular velocity comprising the steps of:

positioning a plurality of linear accelerometers in fixed positions relative to a body whose angular and linear motion are to be measured, each of said linear accelerometers having a sensitive axis for producing linear accelerometer signals, said step of positioning said plurality of linear accelerometers in fixed positions relative to a body comprising:

positioning three linear accelerometers such that their respective sensitive axes are in substantially mutually orthogonal relationship to define therewith first, second and third axes intersecting at a single point to define an origin point;

positioning a first pair of linear accelerometers disposed along said first axis spaced a first fixed distance from said origin point, said sensitive axes thereof intersecting said first axis and in substantially orthogonal relationship with each other and with said first axis;

positioning a second pair of linear accelerometers disposed along said second axis spaced a second fixed distance from said origin point, said sensitive axes thereof intersecting said second axis and in substantially orthogonal relationship with each other and with said second axis; and positioning a third pair of linear accelerometers disposed along said third axis spaced a third fixed distance from said origin point, said sensitive axes thereof intersecting said third axis and in substantially orthogonal relationship with each other and with said third axis;

operating said linear accelerometers such that linear accelerometer signals are produced thereby; and processing said linear accelerometer signals with a processor means and calculating from said linear accelerometer signals output values related to both the angular and linear motion of said body.

15. The method of claim 14 wherein said step of positioning said plurality of linear accelerometers in fixed positions relative to a body comprises the steps of:

disposing said plurality of linear accelerometers in fixed positions in a structure; and connecting said structure to a body whose angular and linear motion are to be measured.

16. The method of claim 14 wherein said step of positioning said plurality of linear accelerometers comprises positioning at least two of said first, second and third pairs of linear accelerometers at first, second and third fixed distances, respectively, which are the substantially the same.

17. The method of claim 14 wherein:

said step of positioning the first pair of linear accelerometers includes further positioning their corresponding sensitive axes substantially parallel with said second and third axes, respectively;

said step of positioning the second pair of linear accelerometers includes further positioning their corresponding sensitive axes substantially parallel with said first and third axes, respectively; and said step of positioning the third pair of linear accelerometers includes further positioning their corresponding sensitive axes substantially parallel with said first and second axes, respectively.

* * * * *